(12) United States Patent
Holmberg et al.

(10) Patent No.: US 9,336,808 B2
(45) Date of Patent: May 10, 2016

(54) MAGNETIC TAPE PROCESSING

(71) Applicant: Hewlett Packard Enterprise Development LP, Houston, TX (US)

(72) Inventors: Mike Alan Holmberg, Eagle, ID (US); Geoff Spratt, Boise, ID (US); Brian Brong, Boise, ID (US); Mike Sharrock, Boise, ID (US); Steven L. Brittenham, Boise, ID (US); Scott A. Swanbeck, Nampa, ID (US); Eric Petersen, Boise, ID (US); Lawrence A. Hansen, Meridian, ID (US); Paul W. Poorman, Meridian, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/443,548

(22) PCT Filed: Jan. 31, 2013

(86) PCT No.: PCT/US2013/024203
§ 371 (c)(1),
(2) Date: May 18, 2015

(87) PCT Pub. No.: WO2014/120221
PCT Pub. Date: Aug. 7, 2014

(65) Prior Publication Data
US 2015/0302879 A1 Oct. 22, 2015

(51) Int. Cl.
*G11B 5/02* (2006.01)
*G11B 5/78* (2006.01)
*G11B 5/008* (2006.01)
*G11B 20/10* (2006.01)
*G11B 5/00* (2006.01)

(52) U.S. Cl.
CPC .............. *G11B 5/78* (2013.01); *G11B 5/00826* (2013.01); *G11B 20/10287* (2013.01); *G11B 2005/0021* (2013.01)

(58) Field of Classification Search
CPC .................. G11B 5/02; G11B 5/1278; G11B 2005/0002; G11B 20/18; G11B 5/3106; G11B 5/6088; G11B 2005/0024
USPC .......................... 360/59, 31; 369/13.33, 13.02
See application file for complete search history.

(56) References Cited

U.S. PATENT DOCUMENTS

| | | |
|---|---|---|
| 5,045,379 A | 9/1991 | Kotani et al. |
| 6,726,986 B2 | 4/2004 | Mori |
| 6,790,511 B2 | 9/2004 | Mori |
| 7,501,194 B2 | 3/2009 | Murayama et al. |
| 8,279,554 B2 | 10/2012 | Noguchi et al. |

(Continued)

OTHER PUBLICATIONS

ISR/WO, PCT/US2013/024203, HP reference 83139457, Oct. 25, 2013, 12 pps.

*Primary Examiner* — Nabil Hindi
(74) *Attorney, Agent, or Firm* — Dicke, Billig, Czaja, PLLC

(57) ABSTRACT

A system including a magnetic tape processing system that includes a read/write head to write to a top surface of a magnetic tape. The read/write head provides a write head field gradient of at least 40 Oersteds per nanometer at the top surface of the magnetic tape. The magnetic tape processing system and the read/write head provide a track density of greater than 8000 tracks per inch, a bit density of greater than 440 kilo-bits per inch, and an aspect ratio of less than 70.

15 Claims, 3 Drawing Sheets

(56) References Cited

U.S. PATENT DOCUMENTS

| | | |
|---|---|---|
| 2005/0282041 A1 | 12/2005 | Yamazaki et al. |
| 2006/0187564 A1 | 8/2006 | Sato |
| 2006/0187589 A1 | 8/2006 | Harasawa et al. |
| 2008/0239541 A1 | 10/2008 | Shimazawa et al. |
| 2009/0002878 A1 | 1/2009 | Oka |
| 2009/0080295 A1* | 3/2009 | Kojima .............. G11B 5/02 369/13.02 |
| 2009/0098414 A1 | 4/2009 | Ooishi et al. |
| 2009/0161256 A1 | 6/2009 | Wu |
| 2011/0242698 A1 | 10/2011 | Lowery et al. |
| 2011/0279920 A1 | 11/2011 | Takano et al. |

* cited by examiner

MAGNETIC TAPE PROCESSING

BACKGROUND

Magnetic tape data storage uses digital recordings on magnetic tape to store digital information. Often, magnetic tape is used for offline, archival data storage, where magnetic tape is the primary copy of stored data. Generally, magnetic tape is cost effective and has long archival stability, such as thirty years or more.

Often, magnetic tape is packaged in tape cartridges or tape cassettes. Tape drives write data to and read data from these tapes. Autoloaders and tape libraries store the tapes and automate tape handling.

DETAILED DESCRIPTION

In the following detailed description, reference is made to the accompanying drawings which form a part hereof, and in which is shown by way of illustration specific embodiments in which the techniques of the present application may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the techniques of the present application. It is to be understood that features of the various embodiments described herein may be combined with each other, unless specifically noted otherwise.

In one example, the present application provides techniques to increase storage capacity of magnetic tape or magnetic recording medium. In one example, the techniques provide a magnetic tape processing system that can record (write) and retrieve (readback) information from magnetic recording medium formed in part of barium ferrite material. The techniques include a magnetic tape formed with combinations of characteristics such as smoothness, tape tension, head spacing, writing heat, format compliance, abrasivity of cartridge leader, percentage of the media particles in a perpendicular orientation, and bit density. The techniques may also provide a magnetic tape that incorporates the above parameters and include a read/write head structure with a partial response maximum likelihood (PRML) channel and an magneto-resistive (MR) head to read data from the tape stored information in a format that is backward compatible and usable with future generation of tape products. The techniques may also provide a magnetic tape formed with the above parameters or characteristics that can provide a specific bit volume, flux density and written or read bit aspect ratio (length to width ratio), and full cartridge capacity when written and wound into a removable media cartridge.

Figure 1:
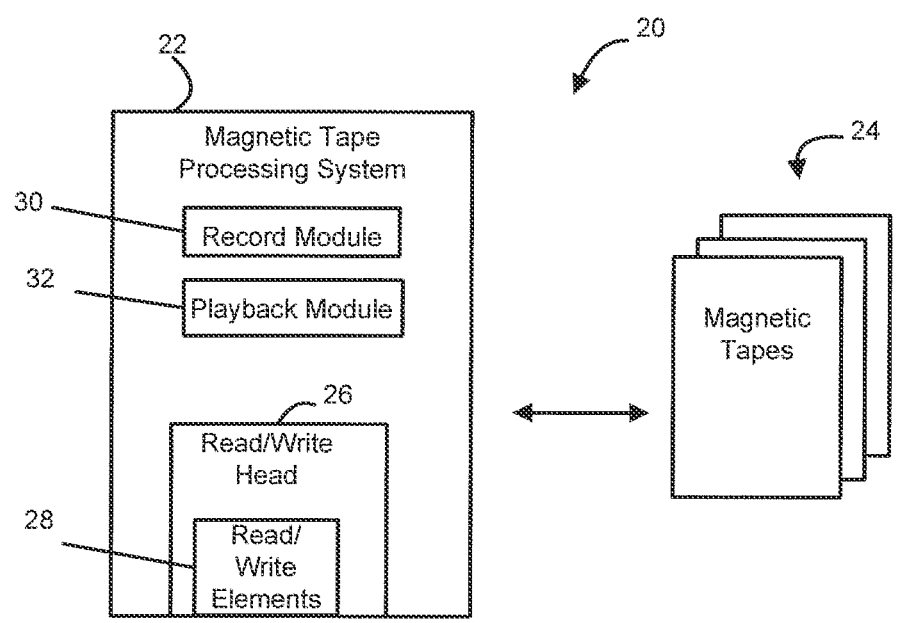
FIG. 1 is a diagram illustrating one example of a data storage system in accordance with an example of the techniques of the present application.

FIG. 1 is a diagram illustrating one example of a data storage system 20 that includes a magnetic tape processing system 22 and magnetic tapes 24. In one example, magnetic tapes 24 can include magnetic recording medium to allow magnetic data to be written to the medium and to be read back from the medium. In one example, data storage system 20 can be configured to operate as an open-format tape system, where the term open-format may refer to a format in which users have access to multiple sources of compatible storage media products. In one example, data storage system 20 is a linear tape open (LTO) data storage system. In one example, data storage system 20 is an LTO-7 or higher generation data storage system. In one example, data storage system 20 is an LTO-7 or higher generation data storage system that is backward compatible to at least one previous generation.

The magnetic tape processing system 22 includes a read/write head 26 to write to each of the magnetic tapes 24. The read/write head 26 includes one or more read/write elements 28. In one example, at least one of the read/write elements 28 includes a magneto-resistance (MR) type read element, such as an anisotropic magneto-resistance (AMR) element, a tunneling magneto-resistance (TMR) element, a giant magneto-resistance (GMR) element, a current perpendicular giant magneto-resistance (CPPGMR) element, or a colossal magneto-resistance (CMR) element. In one example, an MR type element can be used in writing or recording data to magnetic tape and can include a device having the properties of changing resistance when a magnetic field is presented to the device. In one example, MR elements can be configured or incorporated into recording head structures, such as magnetic read/write head 26 and read/write elements 28, allowing for differing response ratios for a given magnetic field depending on factors such as biasing design, shield to shield spacing, electrical current density, and other factors. In another example, GMR, TMR, and CMR magneto-resistive recording devices are also known as spin-valve type devices since they utilize the electron spin in the material to derive their magneto-resistive response.

In one example, to write data to one of the magnetic tapes 24, magnetic tape processing system 100 can operate read/write head 26 and read/write elements 28 to generate or provide a write head field gradient of at least 40 Oersteds (Oe) per nanometer (nm) at the surface of the magnetic tape. The write head field gradient is defined as the maximum value of a derivative of the magnetic field with respect to distance in the direction of tape travel. In one example, read/write head 26 can generate or provide a write head field gradient of approximately 70 Oe per nm at or near the top surface of the magnetic tape.

In one example, magnetic tape processing system 22 can write data to magnetic tapes 24 at approximately a track density of greater than 8000 tracks per inch, i.e., a track width of less than 3.2 micrometers, a bit density of greater than 440 kilobits per inch, and an aspect ratio, which is the ratio of track width to bit length, of less than 70. The track density can be defined as the number of tracks of data per inch as measured across the top surface of the magnetic tape, substantially orthogonal to the direction of travel of the magnetic tape. The bit density is the number of bits available to be read by a system per inch as measured along a track in the direction of travel of the magnetic tape.

In another example, magnetic tape processing system 22 can include a read channel, such as a partial response maximum likelihood (PRML) channel, a class IV partial response channel (PR4), a maximum likelihood detector (MLD) channel, and/or a least density parity code (LDPC) channel. In one example, PRML channels can include PRML and extended PRML's such as EPRML and E2PRML. In one example, PR4 channels can include PR4 and extended PR4's such as EPR4 and E2PR4. In one example, MLD channels can include noise predictive MLD (NPMLD) and data dependent NPMLD (DDNPMLD). In one example, the read channel detects and decodes data previously written to a magnetic tape, where the data may be aggressively written onto the magnetic tape, such that advanced techniques may be necessary to recover the original signal in the presence of readback noise and intersymbol interference caused by the high packing density of the written data transitions. In one example, the above mentioned channels assume linearity in the read/write process, but DDNPMLD channels can accommodate non-linear noise and other channel variants that deal with a read/write head and magnetic tape non-linearities on either the writing or the readback side.

In one example, read/write head 26 can include a heat assisted write head that heats or increases the temperature of one of the magnetic tapes 24, when writing to the surface of the magnetic tapes 24, to lower the coercivity of the magnetic tape and write to the magnetic tape. Coercivity may be defined as the strength of a magnetic field needed to reduce the magnetization of a material to zero after the material has been subjected to a magnetic field in the opposite direction of sufficient strength to substantially saturate the material magnetically. In one example, the heat assisted read/write head provides curie-point writing between 300 and 450 degrees centigrade to lower the coercivity of the magnetic material. In one example, the heat assisted read/write head can heat or increase the temperature of the magnetic tape, when writing data to the surface of the magnetic tape, to a temperature of between 200 and 270 degrees centigrade to lower the coercivity of the magnetic material and write to the magnetic material.

In one example, magnetic tape processing system 22 can include functionality to operate read/write head 26 and read/write elements 28 to write data to each of the magnetic tapes 24 and to read data from each of the magnetic tapes 24. For example, magnetic tape processing system 22 can be configured to cause a magnetic tape from the magnetic tapes 24 to be positioned near read/write head 26 and read/write elements 28 to allow the system to write data to the tape and read data from the tape. The functionality can be implemented in hardware, software, or a combination thereof.

In one example, magnetic tape processing system 22 can include a record module 30 configured to perform a record process that includes writing data to magnetic tapes 24. The record module 30 can be implemented in hardware, software, or a combination thereof. In one example, the record module 30 can receive from a host or other electronic device requests to write data to a magnetic tape. The record module 30 can cause the magnetic tape 24 to move past read/write head 26 to write data to the magnetic tape. In another example, record module 30 can cause a top surface of the magnetic tape to be positioned underneath the bottom surface of the read/write elements 28 to allow the read/write elements 28 to write data to the magnetic tape. The record module 30 can translate the data from an electronic form into a magnetic form that can be written to a magnetic tape, such as one of the magnetic tapes 24.

In another example, magnetic tape processing system 22 can include a playback module 32 configured to perform a read or playback process that includes reading data from magnetic tapes 24. The playback module 32 can be implemented in hardware, software, or a combination thereof. In one example, playback module 32 can receive from a host or other electronic device requests to read data from a magnetic tape. The playback module 32 can cause the magnetic tape to move past read/write head 26 to read data from the magnetic tape. In one example, playback module 32 can cause a top surface of the magnetic tape to be positioned underneath the bottom surface of the read/write elements 28. The playback module 32 can translate data in a magnetic form from magnetic tape into an electronic form. In one example, the read/write element 28 can include a PRML channel and an MR read element to help translate magnetic information from magnetic tape to electronic form. In another example, playback module 32 can include read amplifier functionality to help amplify the translated electronic data. In another example, playback module 32 can include read/write channel detection functionality to convert the signals to digital form to be processed by the host or other electronic device.

Figure 2:
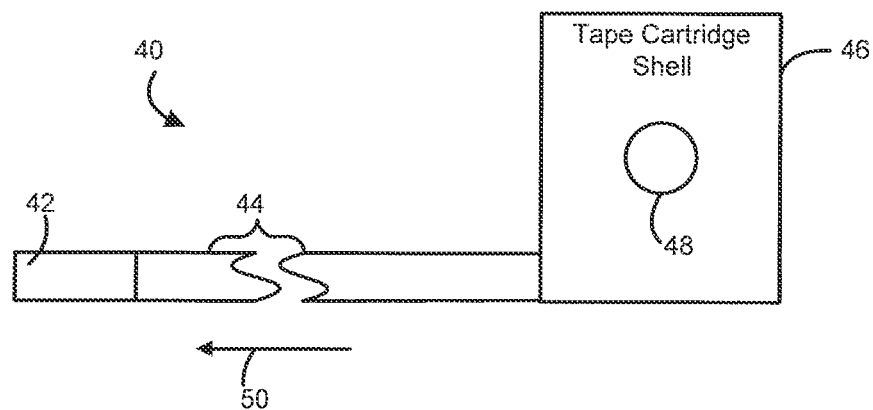
FIG. 2 is a diagram illustrating one example of a magnetic tape system in accordance with an example of the techniques of the present application.

FIG. 2 is a diagram illustrating one example of a magnetic tape system 40 used in data storage system 20. Magnetic tape system 40 includes a leader 42, magnetic tape 44, and a magnetic tape cartridge shell 46 that includes a magnetic tape supply reel 48. Magnetic tape system 40 is similar to each of the magnetic tapes 24 (shown in FIG. 1). In another example, magnetic tape cartridge shell 46 includes two reels, where one is a supply reel and the other is a take-up reel. In another example, magnetic tape cartridge shell 46 includes two reels, where one is a supply reel and the other is a take-up reel, and a guiding mechanism for guiding the magnetic tape past the read/write head.

The magnetic tape cartridge shell 46 can include or support the magnetic tape supply reel 48. Magnetic tape 44 is wound around supply reel 48 and a tape read/write system, such as magnetic tape processing system 22, can pull leader 42 to pull magnetic tape 44 out of magnetic tape cartridge shell 46, in the direction shown by arrow 50. The magnetic tape read/write system can wind the leader 42 and magnetic tape 44 onto a take-up reel in the tape read/write system. In one example, leader 42 can be an abrasive leader that makes contact with a bottom surface of a read/write head to clean the read/write head, such as read/write head 26, and other components in the tape read/write system as the abrasive leader is pulled out of the magnetic tape cartridge shell 46 and across the read/write head and the other components. In one example, leader 42 can be an abrasive leader that has an average wear pattern length in an Alfesil wear bar of less than or equal to 81 micrometers after 100 passes using an LTO type abrasivity test. In one example, leader 42 can be an abrasive leader that includes polyethylene naphthalate (PEN). In one example, leader 42 can be an abrasive leader that is made entirely of PEN using standard slip or roughening agents, where the PEN film can be thicker than the magnetic tape 44 and contain more and/or larger slip particles. In one example, leader 42 can be an abrasive leader that includes polyethylene teraphthalate (PET). In one example, leader 42 can be an abrasive leader that is made entirely of PET using standard slip or roughening agents, where the PET film can be thicker than the magnetic tape 44 and contain more and/or larger slip particles.

Figure 3:
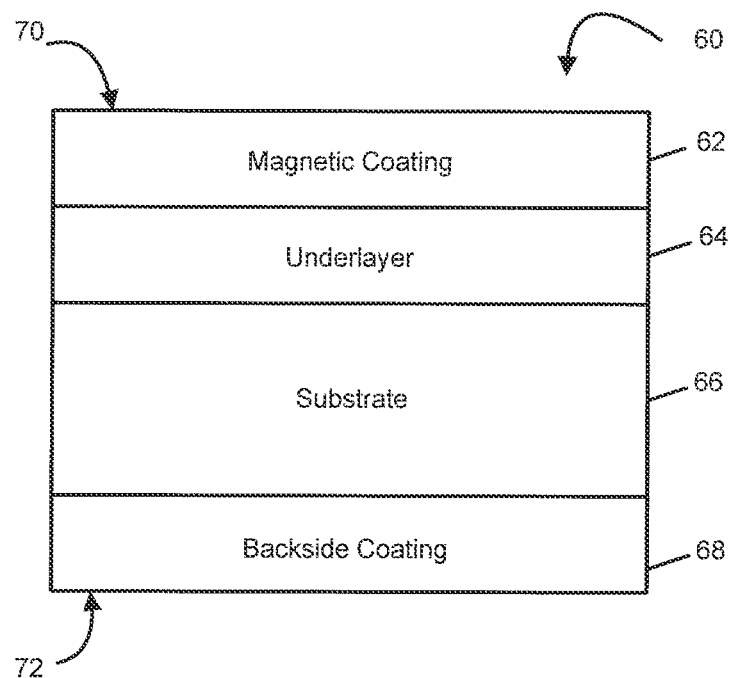
FIG. 3 is a diagram illustrating one example of a magnetic tape in accordance with an example of the techniques of the present application.

FIG. 3 is a diagram illustrating one example of a cross-section of magnetic tape 60 used in data storage system 20. Magnetic tape 60 includes a magnetic coating 62, an underlayer 64, a substrate 66, and a backside coating or back coat 68. Magnetic tape 60 has a top surface 70, which can be the surface of magnetic coating 62, and magnetic tape 60 includes a back side 72. In one example, magnetic tape 60 is similar to magnetic tape 44.

Magnetic coating 62 includes magnetic material that is magnetized to store data or digital information. In one example, magnetic coating 62 includes magnetic particles or pigment suspended in a binder, such as a polymer binder, where the binder holds the magnetic particles together and to an underlayer or substrate. In one example, the binder can be a mixture of polyester polyurethane copolymers along with polyvinyl chloride (PVC) or PVC copolymers, where the mixture can include self wetting groups. In one example, magnetic coating 62 includes magnetic particles or pigment suspended in a binder, where the binder provides a smooth surface to facilitate transportation of the magnetic tape through a tape read/write system. In one example, the binder provides a smooth surface having an average roughness (Ra) of less than approximately 6 nm, a root mean square roughness (Rq or Rrms) of approximately less than 18 nm, and an average of the five highest maximum heights of the profile along a sample length roughness (Rz) of less than 30 nm. In one example, a lubricant is added to the binder to reduce friction, which reduces tape wear and the tension needed to transport the magnetic tape through a tape read/write system. In one example, the lubricant is a mixture of carboxylic acid and esters, such as stearic acid and butoxyethyl stearate. In one example, material such as a head cleaning agent is added to the binder to help reduce the occurrence of head clogs and/or carbon black is added to help reduce static charges. In one example, the head cleaning agent includes small particle alumina. In one example, the head cleaning agent includes small particle organics having a Mohs hardness of greater than 3. In other examples, the head cleaning agent includes small particle inorganics such as silicon dioxide, silicon nitride, and titanium nitride. In one example, the magnetic coating 62 has a thickness between 0.025 um and 0.1 um.

Underlayer 64 supports magnetic coating 62 and, in at least some instances, can increase the smoothness of magnetic coating 62. In one example, underlayer 64 can be one individual underlayer. In one example, underlayer 64 includes more than one individual underlayer. In one alternative example, underlayer 64 is absent, i.e., magnetic tape 60 does not include underlayer 64 and magnetic coating 62 can be applied directly to substrate 66.

In one example, underlayer 64 contains polymers in the same classes as those used in the magnetic coating 62. Mixtures of polyester polyurethane copolymers along with polyvinyl chloride (PVC) or PVC copolymers, however, the choice of Tg, hard versus soft segment ratio, molecular weight, cross linkable functional group equivalents, loading of inorganics such as carbon black and other inorganic particles, and lubricants is changed to meet design criteria. The underlayer thickness can be between 0.1 and 1.0 um and more particularly between 0.4 and 0.8 um, and the underlayer 64 can be applied using a variety of coating techniques, such as the extrusion onto the substrate 66. In one example, underlayer 64 is non-magnetic material. In one example, underlayer 64 includes a magnetically soft and relatively thick layer under magnetic coating 62 and magnetic flux is guided through the underlayer 64. In other examples, magnetic tape 60 includes multiple underlayers.

Substrate 66 provides support for underlayer 64 and magnetic coating 62. Back coat 68 is applied to the backside of substrate 66. The back coat 68 can reduce tape friction, dissipate static charge, and reduce tape distortion by providing more uniform winding of the magnetic tape on the tape supply reel and the tape take-up reel. In one example, back coat 68 contains polymers in the same classes as those used in the magnetic coating 62 and underlayer 64. Mixtures of polyester polyurethane copolymers along with polyvinyl chloride (PVC) or PVC copolymers. However, the choice of Tg, hard versus soft segment ratio, molecular weight, cross linkable functional group equivalents, loading of inorganics such as carbon black and other inorganic particles, and lubricants is changed to meet design criteria for the back coat 68. The material characteristics, including polymer choices, for the back coat 68 are such that the mechanical toughness is higher, particle loading is lower, and the back coat 68 can have a higher percentage of carbon black for increased conductivity. The back coat dispersion preparation and particle size selection can lead to final surface roughness that is much higher than underlayer 64 and magnetic coating 62. The back coat thickness can be between 0.2 and 0.7 um, and the back coat 68 can be applied using a variety of coating techniques, such as die extrusion.

In one example, each of the magnetic coating of magnetic tape 44 and magnetic coating 62 can have an average roughness (Ra) of less than approximately 6 nm, a root mean square roughness (Rq or Rrms) of approximately less than 18 nm, and an average of the five highest maximum heights of the profile along a sample length roughness (Rz) of less than 30 nm. In another example, each of the magnetic coating of magnetic tape 44 and magnetic coating 62 can have a squareness, or ratio of remnant magnetization to saturation magnetization, measured in any direction of between 0.25 and 0.98. In one example, the magnetic coating of magnetic tape 44 and/or magnetic coating 62 includes a metal particle (MP) magnetic medium. In one example, the magnetic coating of magnetic tape 44 and/or magnetic coating 62 includes a metal evaporated (ME) magnetic thin film. In one example, the magnetic coating of magnetic tape 44 and/or magnetic coating 62 includes a dried dispersion of hexagonal ferrite magnetic particles. In one example, the magnetic coating of magnetic tape 44 and/or magnetic coating 62 includes a dried dispersion of strontium ferrite magnetic particles. In one example, the magnetic coating of magnetic tape 44 and/or magnetic coating 62 includes a dried dispersion of barium ferrite magnetic particles. In one example, the magnetic coating of magnetic tape 44 and/or magnetic coating 62 includes a sputtered magnetic thin film. In one example, the magnetic coating of magnetic tape 44 and/or magnetic coating 62 includes a dried dispersion of non-hexagonal-ferrite magnetic particles, e.g., acicular metallic particles.

In one example, each of the back coat of magnetic tape 44 and back coat 68 can have an average roughness (Ra) of less than 40 nm, a root mean square roughness (Rq or Rims) of less than 80 nm, and an average of the five highest maximum heights of the profile along a sample length roughness (Rz) of less than 100 nm.

Each of the layers 62, 64, and 68 can be applied as wet dispersions of particulate dispersions, which are then dried. The sublayer or underlayer 64 can be applied and dried, followed by the application and drying of the magnetic layer 62. Alternatively, underlayer 64 and magnetic layer 62 can be applied sequentially in the wet state and dried together. The backcoat or backside coating 68 can be applied and dried before or after underlayer 64 and magnetic layer 62. Each of the layers 62, 64, and 68 can be applied by coating methods, such as gravure coating or die coating.

Figure 4:
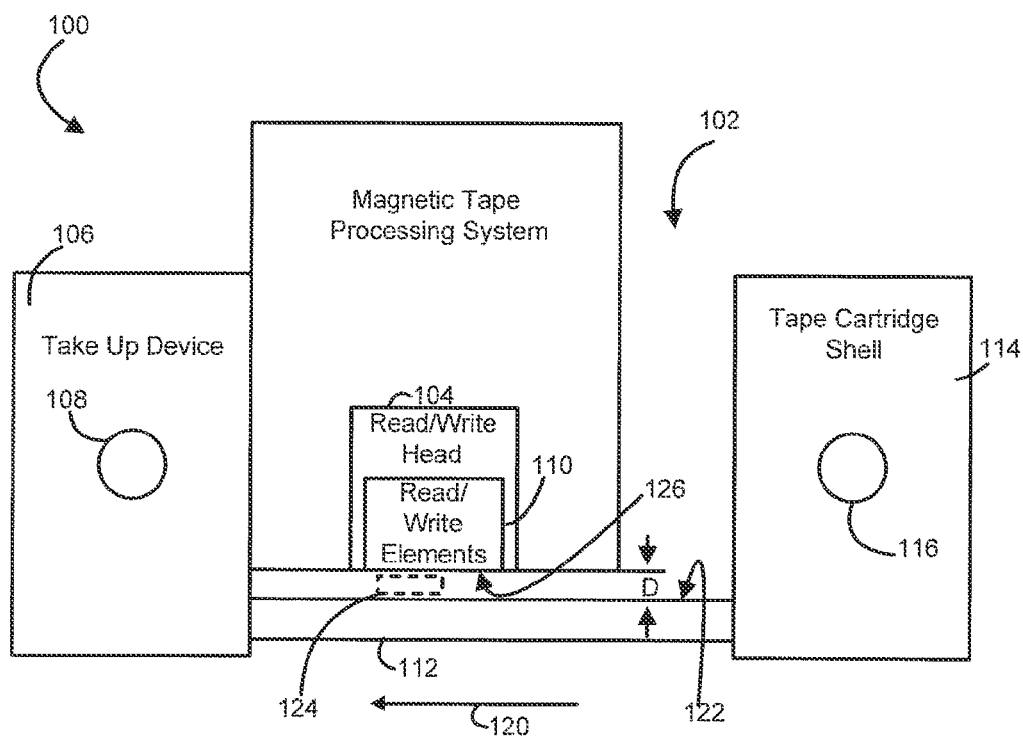
FIG. 4 is a diagram illustrating one example of a magnetic tape processing system and a magnetic tape system in accordance with an example of the techniques of the present application.

FIG. 4 is a diagram illustrating one example of a magnetic tape processing system 100 and a magnetic tape system 102. The magnetic tape processing system 100 is similar to magnetic tape processing system 22 (shown in FIG. 1). Magnetic tape system 102 is similar to magnetic tape system 40 of FIG.

2. In one example, magnetic tape processing system 100 and magnetic tape system 102 can be part of a data storage system, such as data storage system 20.

The magnetic tape processing system 100 includes a read/write head 104 and a take-up device 106 that includes a tape take-up reel 108. The read/write head 104 includes one or more read/write elements 110 that read from and write to magnetic tape system 102. In one example, at least one of the read/write elements 110 includes an MR type element, such as an AMR element, a TMR element, a GMR element, a CPPGMR element, or a CMR element.

Magnetic tape system 102 includes a leader (not shown in FIG. 4), magnetic tape 112, and a magnetic tape cartridge shell 114 that includes a magnetic tape supply reel 116. In another example, magnetic tape cartridge shell 114 includes two reels, where one is a supply reel and the other is a take-up reel. In another example, magnetic tape cartridge shell 114 includes two reels, one supply reel and one take-up reel, and a guiding mechanism for guiding the magnetic tape past the read/write head.

The magnetic tape processing system 100 pulls on the leader to pull magnetic tape 112 off supply reel 116 and out of magnetic tape cartridge shell 114, in the direction shown by arrow 120. The magnetic tape processing system 100 winds the leader and magnetic tape 112 onto take-up reel 108. In one example, the leader can be an abrasive leader that cleans read/write head 104, read/write elements 110, and other components in magnetic tape processing system 100 as the abrasive leader is pulled out of magnetic tape cartridge 112 and across read/write head 104, read/write elements 110, and other components in magnetic tape processing system 100, in the direction as shown by arrow 120. In one example, the leader is an abrasive leader that has an average wear pattern length in an Alfesil wear bar of less than or equal to 81 micrometers after 100 passes using an LTO type abrasivity test. In one example, the leader is an abrasive leader that includes polyethylene naphthalate (PEN). In one example, the leader is an abrasive leader that includes polyethylene teraphthalate (PET).

Magnetic tape 112 includes a magnetic coating that can be formed on an underlayer or on the substrate of magnetic tape 112. The magnetic coating of magnetic tape 112 can be similar to the magnetic coating of magnetic tape 44 and/or the magnetic coating 62 (shown in FIG. 3). In one example, the magnetic coating has a thickness between 0.025 um and 0.1 um. In one example, magnetic tape 112 is similar to magnetic tape 44 (shown in FIG. 2). In one example, magnetic tape 112 is similar to magnetic tape 60 of FIG. 3.

In one example, magnetic tape 112 has a magnetic coating that includes an MP magnetic medium. Particulate magnetic media includes tiny unoxidized metal particles, such as barium ferrite particles, mixed into a liquid plastic binder that is then spread onto the surface of an underlayer or the substrate and cured. The particulate magnetic layer is not made up of pure magnetic material. Instead, the magnetic material includes tiny metal particles suspended in a cured plastic-like binder layer. In one example, magnetic tape 112 includes a dried dispersion of hexagonal ferrite magnetic particles. In one example, magnetic tape 112 includes a dried dispersion of strontium ferrite magnetic particles. In one example, magnetic tape 112 includes a dried dispersion of barium ferrite magnetic particles. In one example, magnetic tape 112 includes a dried dispersion of non-hexagonal-ferrite magnetic particles, e.g., acicular metallic particles.

In one example, magnetic tape 112 has a magnetic coating that includes an ME magnetic thin film, where a thin layer of magnetic material is formed with a metal evaporation process. Materials for ME magnetic thin films include cobalt-nickel alloys. ME magnetic media is different from particulate magnetic media in that the magnetic layer is a more-or-less uniform thin film of material. Also, often a wear layer, such as diamond-like carbon (DLC), is applied on top of the magnetic thin film layer.

In one example, magnetic tape 112 has a magnetic coating that includes a sputtered magnetic thin film. The magnetic coating is a thin film of sputtered magnetic material, similar to an ME thin film, but now the process used to create the thin film is sputtering.

In one example, magnetic tape 112 can have a magnetic coating that has an average roughness (Ra) of less than 6 nm, a root mean square roughness (Rq or Rrms) of less than 18 nm, and an average of the five highest maximum heights of the profile along a sample length roughness (Rz) of less than 30 nm. In another example, magnetic tape 112 can include a magnetic coating that has a squareness, or ratio of remnant magnetization to saturation magnetization, measured in any direction of between 0.25 and 0.98.

Magnetic tape 112 has a back coat that has an average roughness (Ra) of less than 40 nm, a root mean square roughness (Rq or Rrms) of less than 80 nm, and an average of the five highest maximum heights of the profile along a sample length roughness (Rz) of less than 100 nm. Magnetic tape 112 is similar to magnetic tape 44 (shown in FIG. 2).

In operation, in one example, magnetic tape processing system 100 can wind magnetic tape 112 between take-up reel 108 and supply reel 116. Magnetic tape 112 is pulled across read/write head 104 and read/write elements 110 to read from and write to magnetic tape 112, in the direction shown by arrow 120. In one example, magnetic tape processing system 100 can provide a tape tension of approximately less than 4 newtons (N) on magnetic tape 112. Tape tension can be defined as the tension in magnetic tape 112 in the direction of travel of magnetic tape 112 as magnetic tape 112 is guided along its path over read/write head 104, such as the direction shown by arrow 120. In another example, magnetic tape processing system 100 can provide a spacing distance D of between 0 and 100 nm between the bottom surface 126 of read/write head 104 and top surface 122 of magnetic tape 112.

In one example, read/write head 104 and read/write elements 110 can provide a write head field gradient 124 at the top surface 122 of magnetic tape 112 to write to magnetic tape 112. The write head field gradient can be defined as the maximum value of a derivative of the magnetic field with respect to distance in the direction of tape travel. In one example, read/write head 104 and read/write elements 110 can provide a write head field gradient of at least 40 Oe per nm at the top surface 122 of magnetic tape 112. In one example, read/write head 104 and read/write elements 110 can provide a write head field gradient of 70 Oe per nm at the top surface 122 of magnetic tape 112.

In one example, magnetic tape processing system 100 can provide a track density of greater than 8000 tracks per inch (or a track width of less than 3.2 micrometers), a bit density of greater than 440 kilobits per inch, and a bit aspect ratio, which is the ratio of track width to bit length, of less than 70. In one example, read/write head 104 and read/write elements 110 can write to magnetic tape 112 and provide a write head field gradient of at least 40 Oe per nm at the top surface 122 of magnetic tape 112 to provide a track density of greater than 8000 tracks per inch, a bit density of greater than 440 kilo-bits per inch, and an aspect ratio of less than 70.

In one example, magnetic tape processing system 100 can use a suitable read channel, such as a PRML channel, a PR4 channel, a MLD channel, and/or a LDPC channel, where PRML channels include PRML, EPRML, and E2PRML, and PR4 channels include PR4, EPR4, and E2PR4, and MLD channels include NPMLD and DDNPMLD. In one example, magnetic tape processing system 100 is a linear tape open system that reads from and writes to a hexagonal ferrite tape, i.e., a magnetic tape that has a magnetic coating layer that is a dried dispersion of barium ferrite particles.

In one example, read/write head 104 can include a heat assisted read/write head that can heat or increase the temperature of magnetic tape 112 to lower the coercivity of magnetic tape 112 for writing to magnetic tape 112. The heat assisted read/write head can include a heat source, such as a laser, an inductive heater, a peltier device, and/or an electron heater, to heat magnetic tape 112. In one example, the heat assisted read/write head provides curie-point writing between 300 and 450 degrees centigrade. In one example, the heat assisted read/write head heats magnetic tape 112 to a temperature of between 200 and 270 degrees centigrade to lower the coercivity of the magnetic material on magnetic tape 112 and write to magnetic tape 112.

Although specific embodiments have been illustrated and described herein, it will be appreciated that a variety of alternate and/or equivalent implementations may be substituted for the specific embodiments shown and described without departing from the scope of the techniques of the present application. This application is intended to cover any adaptations or variations of the specific embodiments discussed herein.

What is claimed is:

1. A system comprising:
a magnetic tape processing system that includes a read/write head to write to a magnetic tape and provide a write head field gradient of at least 40 Oersteds per nanometer at a top surface of the magnetic tape and to provide a track density of greater than 8000 tracks per inch, a bit density of greater than 440 kilo-bits per inch, and an aspect ratio of less than 70.

2. The system of claim 1, wherein spacing between a bottom surface of the read/write head and the top surface of the magnetic tape is between 0 and 100 nanometers to write to the magnetic tape.

3. The system of claim 1, wherein the average roughness of the magnetic tape is less than 6 nanometers, the root mean square roughness of the magnetic tape is less than 18 nanometers, and the average of the five highest maximum heights of the profile along a sample length roughness of the magnetic tape is less than 30 nanometers.

4. The system of claim 1, wherein the magnetic tape includes an abrasive leader to make contact with a bottom surface of the read/write head to clean the read/write head.

5. The system of claim 1, wherein the magnetic tape processing system to provide tape tension of less than 4 newtons.

6. The system of claim 1, wherein the magnetic tape processing system provides a channel that includes at least one of a partial response maximum likelihood channel, a class IV partial response channel, a maximum likelihood detector channel, and a least density parity code channel.

7. The system of claim 1, wherein the read/write head includes a magneto-resistive (MR) read element configured to read data from the top surface of the magnetic tape.

8. The system of claim 1, wherein the magnetic tape is a sputtered magnetic medium tape.

9. A data storage system comprising:
a magnetic tape processing system that includes a heat assisted read/write head to increase temperature of a magnetic tape and lower coercivity of the magnetic tape to write to the magnetic tape, and to provide a write head field gradient of at least 40 Oersteds per nanometer at a top surface of the magnetic tape.

10. The data storage system of claim 9, wherein the magnetic tape processing system to provide a track density of greater than 8000 tracks per inch, a bit density of greater than 440 kilo-bits per inch, and an aspect ratio of less than 70.

11. The data storage system of claim 9, wherein the heat assisted read/write head includes a magneto-resistive (MR) read element configured to read data from a top surface of the magnetic tape.

12. The data storage system of claim 9, wherein the average roughness of the magnetic tape is less than 6 nanometers, the root mean square roughness of the magnetic tape is less than 18 nanometers, and the average of the five highest maximum heights of the profile along a sample length roughness of the magnetic tape is less than 30 nanometers.

13. A method comprising:
spacing a read/write head between 0 and 100 nanometers from a top surface of a magnetic tape and a bottom surface of the read/write head;

providing a read/write head field gradient of at least 40 Oersteds per nanometer at the top surface of the magnetic tape using the read/write head; and writing to the magnetic tape using the read/write head.

14. The method of claim 13, wherein the read/write head provides a track density of greater than 8000 tracks per inch, a bit density of greater than 440 kilo-bits per inch, and an aspect ratio of less than 70.

15. The method of claim 13, wherein the read/write head includes a magneto-resistive (MR) read element configured to read data from the top surface of the magnetic tape.

* * * * *